May 27, 1952 E. R. ODOM ET AL 2,598,418
FRUIT JUICE EXTRACTION
Filed Sept. 2, 1947 4 Sheets-Sheet 3

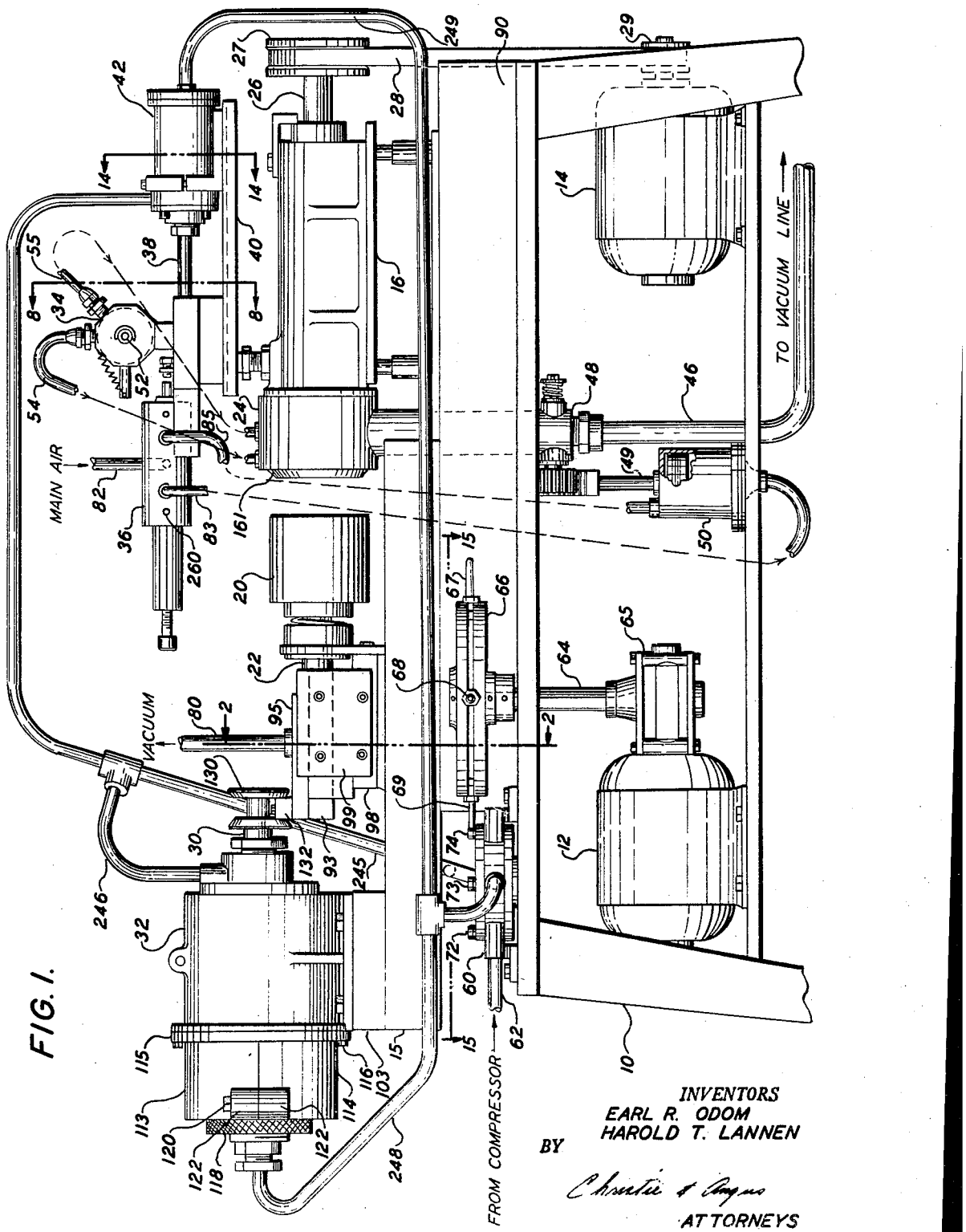

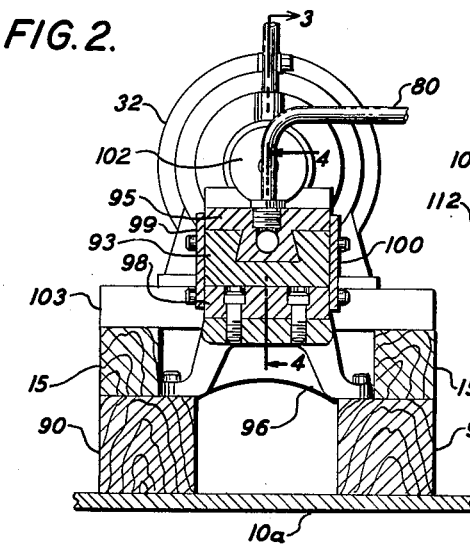
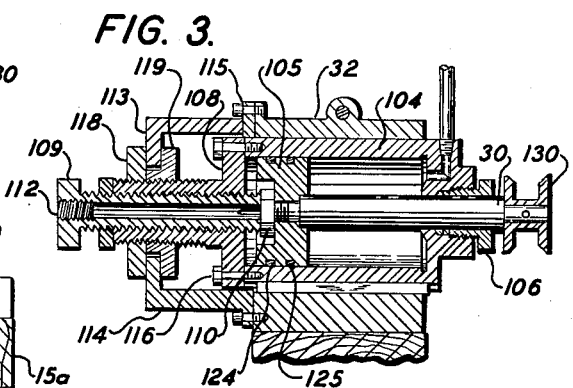
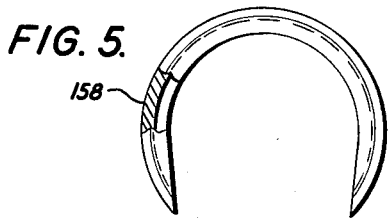
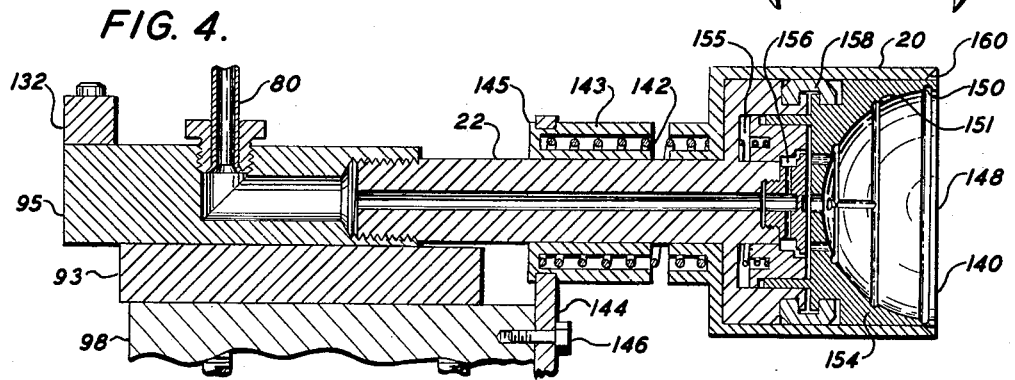
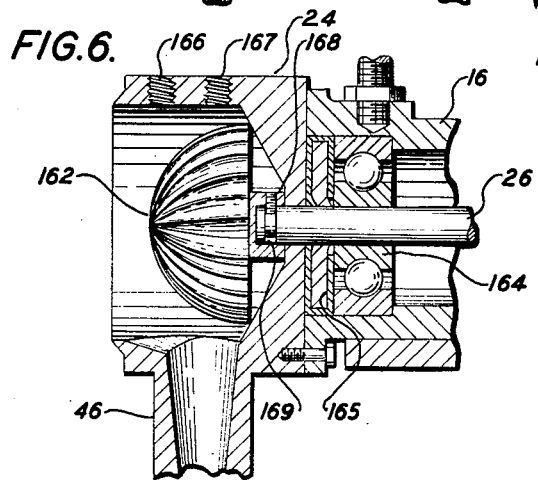
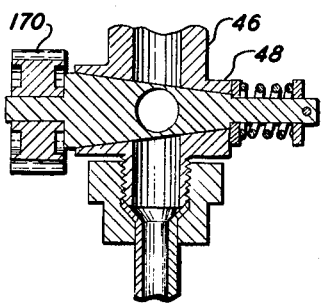

INVENTORS
EARL R. ODOM
HAROLD T. LANNEN
BY
Christie & Angus
ATTORNEYS

May 27, 1952 E. R. ODOM ET AL 2,598,418
FRUIT JUICE EXTRACTION
Filed Sept. 2, 1947 4 Sheets-Sheet 4
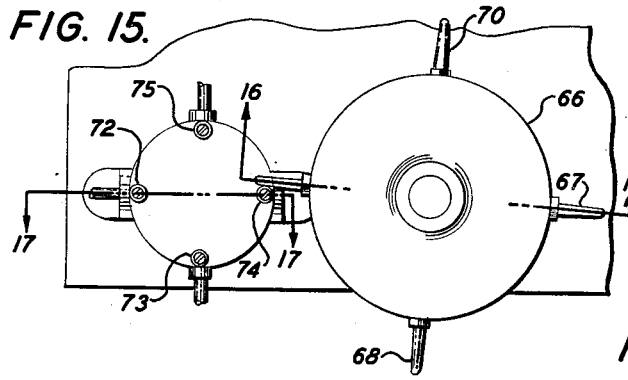
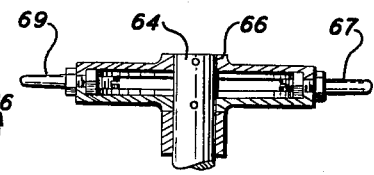
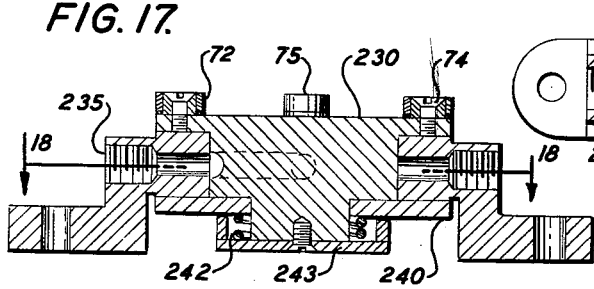
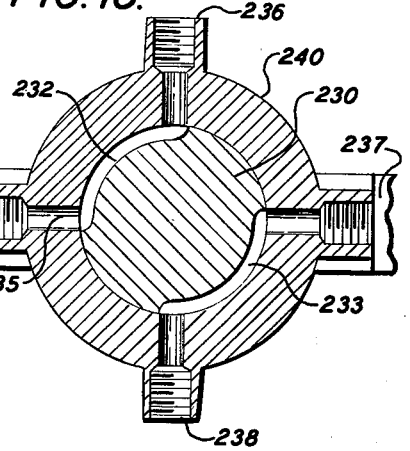
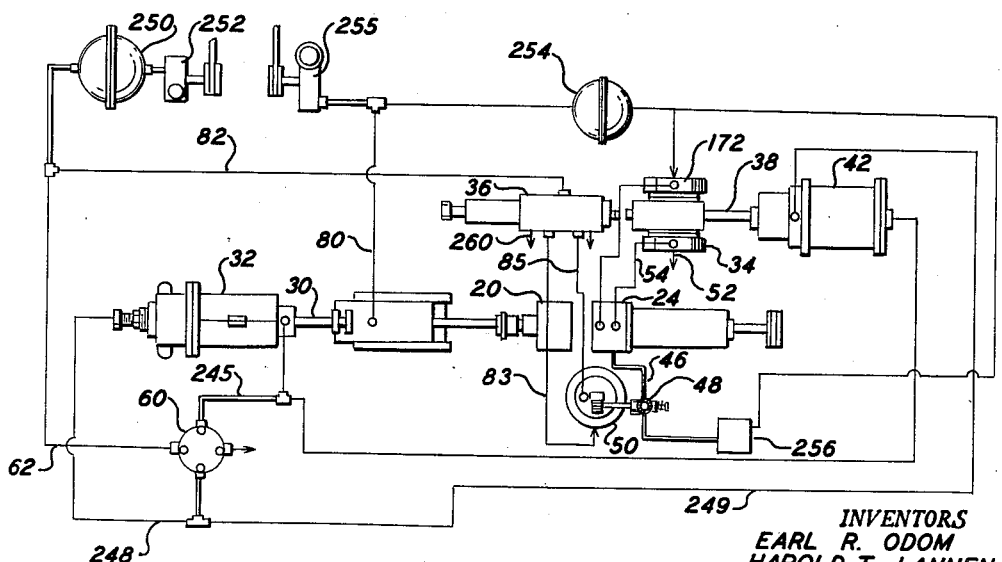
INVENTORS
EARL R. ODOM
HAROLD T. LANNEN
BY
*Christie & Angus*
ATTORNEYS Patented May 27, 1952

2,598,418

UNITED STATES PATENT OFFICE 2,598,418

FRUIT JUICE EXTRACTION

Earl R. Odom, Altadena, and Harold T. Lannen, Pasadena, Calif., assignors to Air Line Engineering Corporation, Pasadena, Calif., a corporation of California Application September 2, 1947, Serial No. 771,814

9 Claims. (Cl. 99—239)

1

This invention relates to fruit juicing apparatus and more particularly to mechanism for juicing citrus fruits such as oranges, lemons, grapefruit, and the like.

An object of the invention is to provide a mechanism adapted to juice fruit under vaccum.

The exposure of citrus fruit juice to the atmosphere has the disadvantage that it causes oxidization of the juice, which impairs its food value and alters its taste. An important feature of this invention is that it enables the fruit to be juiced and stored under vacuum, without atmospheric exposure.

We carry out our invention by the provision of a vacuum sealable juicing chamber within which the juicing of the fruit is accomplished. The fruit is held by a suitable holding device which brings the fruit to be juiced into engagement with a juicing mechanism such as a reamer within the sealable chamber. Provision is made for sealing the chamber when the fruit is juiced so that the juice is extracted under vacuum in the chamber. Means are also provided for drawing off the juice while maintaining it under vacuum.

A further feature resides in the provision of means for opening the chamber to the atmosphere to allow the entrance and withdrawal of fruit to the juicing mechanism and the provision of a plan vacuum doing the juicing and during the time the fruit is juiced and the juice remains in the chamber.

The vacuum juice extraction mechanism in accordance with our invention is operable in itself as a mechanism for extracting juice under vacuum; and is adapted to either manual handling of the fruit or to complete machine handling.

The mechanism may readily be adapted to such juicing machines as that disclosed in the copending application of Earl R. Odom, Serial No. 683,869, filed July 16, 1946, now abandoned, entitled Fruit Juicing Machine, which shows a complete machine for handling and juicing citrus fruits automatically.

The mechanism of our present invention may be readily adapted to that of the said prior application or other fruit juicing machines by locating the juicing reamer of the juicing device of such prior machine within the vacuum chamber of our present invention and feeding the fruit in whatever manner it is handled in such prior machine.

The foregoing and other features and advantages of our invention will be better understood from the following detailed description and the accompanying drawings of which:

2

Fig. 1 is an elevational view of the assembled apparatus;

Fig. 2 is a sectional elevation taken on the line 2—2 of Fig. 1;

Fig. 3 is a sectional elevation taken on the line 3—3 of Fig. 2;

Fig. 4 is a sectional elevation taken on the line 4—4 of Fig. 2;

Fig. 5 is a detailed view of one of the elements of the fruit-holding cup;

Fig. 6 is a sectional elevation of the reamer assembly;

Fig. 7 is a sectional view of the valve in the line communicating between the juicing chamber and the juice storage reservoir;

Fig. 15 is a plan view of the control valve taken on the line 15—15 of Fig. 1;

Fig. 16 is a sectional elevation taken on the line 16—16 of Fig. 15;

Fig. 17 is a sectional elevation taken on the line 17—17 of Fig. 15;

Fig. 18 is a section taken on the line 18—18 of Fig. 17; and

Fig. 19 is a schematic diagram illustrating the operation of the embodiment of the apparatus as shown in Figs. 1–18.

Figure 8:
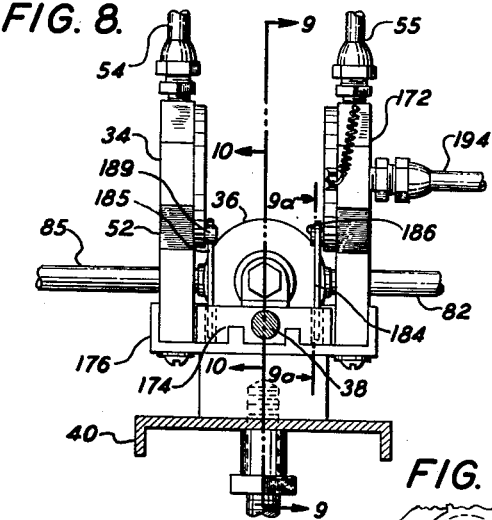
Fig. 8 is a sectional elevation taken on the line 8—8 of Fig. 1.

A general understanding of the apparatus of the invention may be obtained from Fig. 1, which is an elevational view of the assembled apparatus. The fruit juicing machine is conveniently mounted on a chassis 10 which provides support for the motors 12 and 14 together with the other elements of the apparatus as hereinafter described.

A fruit holding cup (not shown) is disposed within the cylindrical housing 20 and is mounted to the carriage 22. A fruit juicer or reamer (not shown) is rotatably mounted within the housing 24 which is supported on the end of the arbor 16. The reamer is mounted on the end of the shaft 26 provided with the pulley 27 which is connected by means of the belt 28 to a pulley 29 mounted on the drive shaft of the motor 14. Thus the motor 14 causes the reamer (not shown) to rotate within the housing 24.

The shaft 22 projects from the carriage 93 which is engaged by the piston 30 the motion of which is controlled within the cylinder 32 by means of compressed air as hereinafter described. Thus the movement of the piston 30 causes the carriage 22 and the housing 20 to move longitudinally toward the housing 24. When the housing 20 and the housing 24 engage to form a sealed chamber the fruit cup (not shown) within the housing 20 continues to move longitudinally so as to cause a section of fruit disposed therein to engage the reamer (not shown) within the housing 24.

A pair of rotor valves 34 and 172 (not shown) and a piston valve 36 actuated by a piston 38 are conveniently mounted on a bed 40 affixed to the arbor 16 as shown. Piston 38 terminates in a head (not shown) within the cylinder 42 and is actuated therein by means of air pressure synchronously with the actuation of the piston 30 within the chamber 32.

A juice reservoir (not shown) is connected by means of the vacuum line 46 to the housing 24 so that the juice extracted from the fruit within the chamber formed by the union of the housing 20 and the housing 24 may be sucked through the vacuum line 46 into the juice reservoir. Disposed in the vacuum line 46 is the valve 48 which is controlled by the piston 49 the operation of which is effectuated in the cylinder 50 furnished with compressed air from the piston valve 36 in a sequence as hereinafter described.

The rotor valve 34 is connected by means of the lines 54 and 55 to the housing 24 and is controlled by means of the piston 38 so as to permit the entry of air therein to destroy the vacuum at the stage in the cycle just prior to the retraction of the housing 20 from the housing 24. The valve 172 (Fig. 8) operates cooperatively with the valve 34 to evacuate the chamber formed by the two housings in the proper time sequence.

The compressed air employed to actuate the pistons 30, 38 and 49 which control the movement of the housing 20, the rotor valve 34, the piston valve 36, and the piston 49 and the valve 48, is introduced from a compressor or compressed air storage tank to a rotor valve 60 by means of the line 62. The rotor valve is constructed as hereinafter shown so as to alternately introduce compressed air into one or the other ends of the cylinders 32 and 42 so as to cause the movement of the pistons 30 and 38. The rotor valve 60 may, if desired, be controlled manually so that the motion of the pistons 30 and 38 will always be under the operator's control or it may be controlled automatically as shown in Fig. 1. Thus, mounted on the shaft 64 which is connected by means of a gear reduction box 65 to the motor 12 is the spline wheel 66 provided with a plurality of splines 67, 68, 69, etc., adapted to engage tits 72, 73, 74, etc., of the rotor valve 60 so as to cause the rotation of the rotor therein.

The fruit holding cup (not shown) disposed in the housing 20 and mounted on the end of the shaft or carriage 22 is adapted to retain a section of fruit therein by means of suction which is automatically applied thereto at the proper times by means of the vacuum line 80 communicating with the fruit cup through the shaft 22. Means are provided with the fruit cup for controlling the vacuum applied thereto in the proper sequence to permit the removal of the juiced section.

The piston valve 36, which controls the operation of the piston 49, actuating the valve 48 as hereinabove described, is actuated by the piston 38. Compressed air from the same compressor or compressed air storage tank hereinbefore mentioned is fed into the valve by means of a line 82 and is distributed by the valve to either the upper or lower sections of the cylinder 50 by means of the line 83 and 84 in the proper sequence.

Fig. 1 furnishes a means of obtaining a general picture of the apparatus of the invention but in order to obtain a thorough understanding thereof, the various sections have been separately illustrated in detail in Figs. 2 to 18.

The construction of the assembly including the housing 20, the shaft 22, the carriage 93, the piston 30, and the cylinder 32 are shown in detail in Figs. 2, 3, 4 and 5.

In Fig. 2 which is a sectional elevation taken on the line 2—2 of Fig. 1 there can be seen the beams 90 and 91 resting on the table top 10A of the chassis 10 (Fig. 1) and supporting the beams 15 and 15a which project beyond the ends of the beams 90 and 91 (see Fig. 1) to furnish support for the cylinder 32. The bed 93, upon which the carriage 95 slides, is mounted to the beams 90 and 91 by means of the spider 96. The carriage 95 from which the shaft 22 (Fig. 1) projects as shown in Fig. 4, is connected to the bed 93 in slidable relationship tongue and groove fashion as shown.

The bed 93 is affixed to the framework 98 by means of the plates 99 and 100 bolted to both the bed 93 and the framework 98.

Leading into the carriage 95 and communicating with the fruit holding cup as shown in Fig. 4 is the vacuum line 80.

Behind the carriage assembly there is seen the inner end of the cylinder 32 and the end face of the cleat member 102 forming the means of connecting the piston 30 (Fig. 3) with the carriage 93. The cylinder 32 is mounted to the plate 103 which forms a platform between the beams 15 and 15a.

The cylinder 32 is shown in detail in the sectional elevation view in Fig. 3 which is an elevation taken on the line 3—3 of Fig. 2. The cylinder 32 comprises the inner cylinder 104 in which the piston head 105 travels, the inner cylinder being covered by the housing 32. The piston 30 projects through the packing gland 106 into the cylinder 104 and is affixed to the cylinder head 105 disposed therein. An end plate 108 closes the cylinder 104 and the nut 109 projects therethrough to form a stop 110, the position of which may be controlled by the nut 109. Projecting longitudinally and concentrically through the nut 109 and the stop 110 is the bore 112 by means of which air may be introduced into the left-hand end of the cylinder 104.

Forming a closure for the left-hand end of the cylinder 104 are the members 113 and 114 which are bolted to the cylinder or housing 32 through the shoulders 115 and 116 respectively and which are fixed to the threaded portion of the cap member 108 by means of the nuts 118 and 119. The two sections 113 and 114 are joined to each other as shown in Fig. 1 by the bolt 120 passing through the bosses 121 and 122 affixed to the sections 113 and 114 respectively. The sections 113 and 114 are provided with similar bosses opposite the bosses 121 and 122 which are likewise bolted together.

The piston head 105 is fitted snugly within the cylinder 104 and is provided with the O rings 124 and 125 to insure efficient operation. As shown in Fig. 1 the piston 30 terminates in the cleat 130 which engages the finger 132 on the carriage 95 transmitting the oscillation of the piston to the carriage.

As shown in Fig. 4 which is a sectional elevation taken on the line 4—4 of Fig. 2, the shaft 22 is affixed to the carriage 95 and communicates therethrough with the vacuum line 80. Mounted on the right hand end of the shaft 22 is the housing 20 and the fruit holding cup 140. The housing 20 and the shaft 22 are frictionally mounted with respect to each other and the housing 20 is anchored to the base 98 by means of the spring 142 disposed in the housing 143 which forms a sleeve around the shaft 22. The housing 143 is in turn affixed to the base 98 by means of the plate 144 fitting into the groove 145 in the housing and joined by means of the bolt 146 to the base.

The fruit cup 140 comprises the spherical sectional recess 148 provided with a plurality of ports 150, 151, etc., communicating as hereinafter described with the vacuum line 80 and furnishing means for applying a suction on the fruit section inserted in the fruit cup 101 so as to retain the section therein. The body 154 of the fruit cup 140 is spring mounted to the shaft 22 by means of the helical spring 155 which is normally under compression causing the body member 154 to be spaced a slight distance from the end of the shaft 22. When the shaft and body member 154 are so spaced the suction applied by means of line 80 is communicated to the various ports 150, 151, etc., in the cup 140 by means of the spider arrangement 156.

The fruit holding cup assembly is constructed in this manner so that at the end of the juicing stroke the thrust exerted on the cup 140 by the reamer contained in the housing member 24 (Fig. 1) will be sufficient to overcome the action of the spring 155 thus forcing the body member 154 toward the end of the shaft 22 closing the gap therebetween and isolating the ports 150, 151, etc., from the vacuum line. In this manner the fruit half is released from the cup 140 after the juice has been extracted therefrom.

Although the body member 154 does not form a part of the shaft 22 it is affixed thereto by means of the locking ring 158 which is shown in Fig. 4 to be of U-shaped relationship in such a manner that they can be pressed together against the force of the spring 155 as above described.

The locking ring 158, shown in detail in Fig. 5, is U-shaped. This shape is selected so as to facilitate assembly of the apparatus. In the assembly the shaft 22 and the body member 154 of the fruit cup 140 are brought in juxtaposition and the locking ring 158 is slipped thereover to engage the two in spaced relationship. Thereafter the shaft and the fruit cup are inserted in the housing 20. Referring to Figs. 1 and 4, as the carriage 95 is thrust toward the right by means of the piston 30 the housing 20 and the fruit cup 140 are thrust toward the housing 24. At such time as the bevel edge 160 of the housing 20 engages the bevel edge 161 of the housing 24 the longitudinal motion of the housing 20 stops and the continued thrust of the carriage 95 forces the fruit cup 140 against the fruit reamer disposed therein as shown in Fig. 6.

Fig. 6 shows a sectional elevation of the housing 24 which contains the reamer 162 mounted on the shaft 26 which projects through the arbor 16 (Fig. 1) and has affixed at its opposite ends a pulley 27 (Fig. 1). The shaft is conveniently mounted in a bearing race 164 and is provided with the oil seal 165. A set screw 168 fitted into the circumferential slot 169 in the shaft 26 prevents longitudinal displacement of the reamer 162.

Lines 54 and 55 (Fig. 1) communicate with the housing 24 by means of the ports 166 and 167 respectively. The line 46 leads from the housing 24 to the evacuated juice reservoir (not shown).

To retain the juice in the reservoir under vacuum when the housings 20 and 24 are separated there is provided in the line 46 a piston control valve 48, shown in sectional elevation in Fig. 7.

The valve 48 is in the form of a conventional spring loaded stop cock and is actuated by the cam 170 wihch is affixed to the end of the piston 49. (See Fig. 1.) The sequence of operation whereby the valve 48 is controlled so as to prevent the juice extracted within the chamber formed by the union of the housings 20 and 24 from being exposed to atmospheric pressure is described hereinafter with relation to Fig. 19.

Fig. 8 is a sectional elevation on the line 8—8 of Fig. 1 showing the rotor valves 34 (shown in Fig. 1) and 172 which control the air and vacuum lines 54 and 55 respectively communicating with the housing 24.

Also shown in Fig. 8 is the piston valve 36 provided with the air inlet line 82 and the outlet lines 82 and 85 of which the line 85 is seen in Fig. 8.

The two rotor valves 34 and 172 and the piston valve 36 are actuated by means of the carriage 174 and the piston 38 which travel longitudinally on the framework 176 which is mounted to the bed 40.

Figure 9:
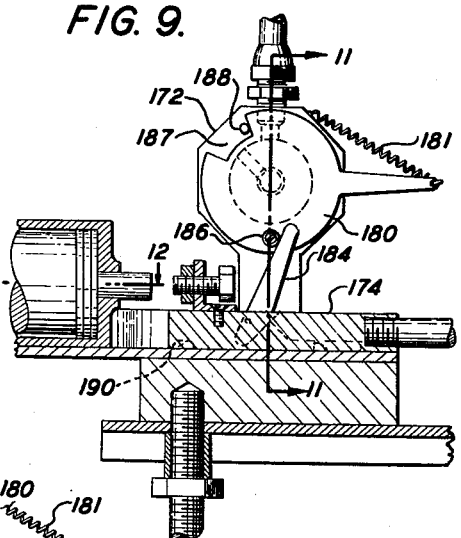
Fig. 9 is a sectional elevation taken on the line 9—9 of Fig. 8.
Figure 9A:
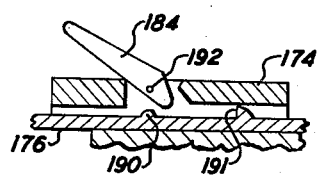
Fig. 9a is a sectional elevation taken of the line 9a—9a of Fig. 8.
Figure 10:
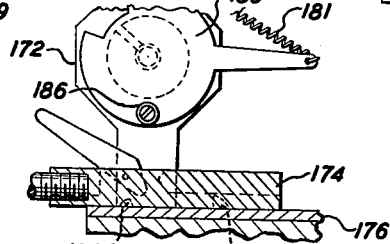
Fig. 10 is a sectional elevation taken on the line 10—10 of Fig. 8.

The construction and operation of the rotor valve 172 is shown in detail in Figs. 9, 9a and 10 and is identical to the construction and operation of the rotor valve 34 with the exception that the rotor valve 172 controls the vacuum line 55 while the rotor valve 34 controls the air line 54.

In Fig. 9 which is a sectional elevation on the line 9—9 of Fig. 8 it is seen that the rotor 180 of the valve 172 is spring mounted by means of the spring 181 which holds the valve in the normally closed position. Mounted to the carriage 174 is the trip finger 184 which is adapted to engage the tit 186 on the rotor 180 during the thrust motion of the carriage 174. In so doing the forward motion of the finger 184 acts against the force of the spring 181 and opens the valve to the extent of the tolerance allowed by the slot 187 the ends of which engage the pin 188 to control the degree of rotation of the rotor 180.

The carriage 174, is shown in Fig. 9 in the midstroke wherein the pin 184 is in the substantially vertical position and is held therein by the carriage 174. In Fig. 9a, which is a sectional elevation on the line 9a—9a of Fig. 8, the carriage 174 is shown at the end of its thrust or forward stroke in which position the pin 184 has dropped to the position there shown to permit the retraction stroke of the carriage without engagement of the pin 184 with the tit 186 on the rotor of the valve. The positioning of the pin 184 and similarly of the corresponding pin 185 which actuates the rotor valve 34 is controlled by the cleats 190 and 191 forming a part of the framework 170 upon which the carriage 174 travels. Thus as the finger 184 travels past the rotor valve 172 the bottom thereof engages the cleat 190 causing the finger to pivot about the point of mounting 192 and to assume the inclined positions shown in Figs. 9a and 10. In the retraction stroke the cleat 191 engages the pin 184 and causes the same to return to the vertical position shown in Fig. 9 and thus to be in a position to again engage the tit 186 in the forward stroke of the carriage 174. During the forward stroke after passage of the finger 184 past the tit 186 the spring 181 exerts a counter-force and returns the rotor 180 of the valve 172 to the normally closed position.

Figure 11:
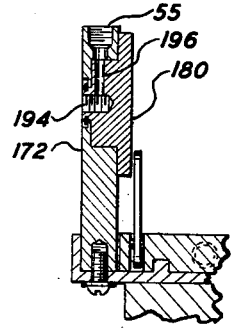
Fig. 11 is a sectional elevation taken on the line 11—11 of Fig. 9.

The construction of one of the rotor valves such as the rotor valve 172 is shown in Fig. 11 and comprises the rotor 180 which is connected to the vacuum inlet line 194 and when open as above described communicates with the vacuum line 55 by means of the channel 196.

Figure 12:
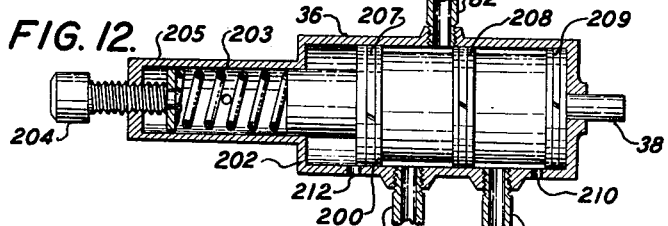
Fig. 12 is a section taken on the line 12—12 of Fig. 9.
Figure 13:
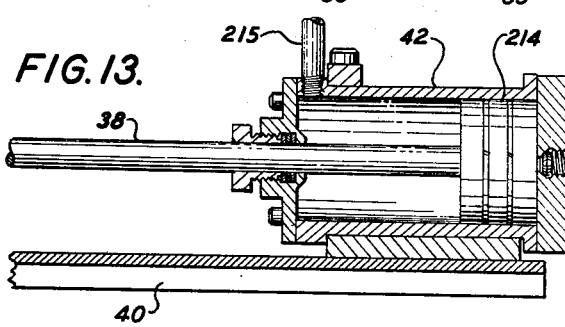
Fig. 13 is a sectional elevation taken on the line 13—13 of Fig. 14.

The piston valve 36, shown in sectional elevation in Fig. 12, is similarly actuated by the piston 38 which is affixed to the piston head 200 disposed within the cylinder 202. This valve is also spring loaded by the helical spring 203, the tension on which may be controlled by the nut 204 projecting through the outer end of the spring housing 205. The body of the piston 200 is of smaller diameter than the internal diameter of the cylinder 202 and is formed into two isolated sections by the piston rings 207, 208 and 209. Air is introduced into the cylinder 202 by means of line 82 and is directed into either line 83 or 85 dependent upon the position of the piston head 200 within the cylinder 202. Thus in the position shown in Fig. 12 compressed air entering by means of line 82 will be directed through line 83 to the lower portion of the cylinder 50 (Fig. 1) to force the piston 49 upwardly and to actuate the valve 48. At the same time the air in the upper portion of the cylinder 50 will be exhausted through line 85 and into the valve 36 and out the exhaust port 210. As the piston 38 is thrust toward the left in Fig. 12 the piston ring 208 will prevent the passage of air from the line 82 to the line 83 and the piston ring 209 will close the exhaust port 210 whereby the air entering the line 82 will be channelled through the line 85 to the upper portion of the cylinder 50 (Fig. 1). At the same time the air previously introduced to the lower portion of the cylinder 50 through the line 83 will be exhausted therethrough to the exhaust port 112 of the valve 36.

The piston 38 which controls the operation of the rotor valves 34 and 172 and the piston valve 36 terminates within the cylinder 42 in the piston head 214. The thrust of the piston 38 is controlled by the master control valve 60 hereinafter described by the introduction of compressed air alternately into line 215 and 216 and into the cylinder 42.

Figure 14:
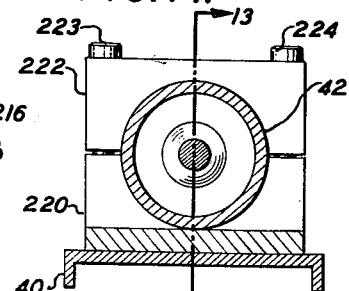
Fig. 14 is a sectional elevation taken on the line 14—14 of Fig. 1.

Fig. 14 which is a section on the line 14—14 of Fig. 1 shows one convenient means of mounting the cylinder 42 on the bed 40. This means comprises the angle bracket 220 recessed to receive the cylinder 42 and the companion bracket 222 similarly recessed and bolted around the cylinder 42 to the bracket 220 by means of the bolts 223 and 224. The horizontal leg of the angle bracket 220 is affixed by means of welding for example to the bed 40.

The master control valve 60 which controls the flow of compressed air to the cylinders 32 and 42 is also a rotor valve and is shown in detail together with the spline wheel adapted to operate the valve in Figs. 15, 16, 17 and 18.

The valve comprises the rotor 230 provided with the two circumferential slots 232 and 233 adapted to communicate between the ports 235, 236, 237 and 238. Mounted on the exterior of the rotor are the four tits 72, 73, 74 and 75 by means of which the rotor may be rotated by means of the splines 67, 68, 69 and 70 projecting from the wheel 66.

The spline wheel 66 which is shown in detail in Fig. 16 is conveniently a hollow disc 66a to which the splines 67, 68, 69, etc., are mounted. The disc 66a is mounted concentrically on the shaft 64 which, as shown in Fig. 1, may be rotated by the motor 12.

As shown in Fig. 17 which is a section view on the line 17—17 of Fig. 15, the rotor 230 is rotatably mounted in the housing 240 and is held therein under a compressive force by means of the helical spring 242 engaging the housing 240 and the flange 243 affixed to the bottom of the rotor 230. The housing 240 is provided with ports communicating between the air lines and the channels 232 and 233 in the rotor. In the position shown in Fig. 18 compressed air introduced through the ports 235 by means of the line 62 passes through the channel 232 out the port 236 and through the line 245 which communicates with the right hand end of the cylinder 32 by means of the bleeder line 246 and with the left hand end of the cylinder 42. At the same time air from the lefthand end of the cylinder 32 and from the right hand end of the cylinder 42 is forced through the lines 248 and 249 respectively into the port 238 of the valve 60, flowing through the channel 263 and is exhausted through the port 237. By rotating the valve clockwise through an angular displacement of 90 degrees the compressed air entering through the port 235 will pass through the channel and out the port 238 to be distributed to the lefthand end of the cylinder 32 and the righthand end of the cylinder 42 by means of the lines 248 and 249 respectively. At the same time the righthand end of the cylinder 32 and the lefthand end of the cylinder 42 will be exhausted through line 245, port 236, channel 232 in the rotor and exhaust port 237.

The operation of the system may be best described with relation to the schematic diagram of Fig. 19 and with reference to the assembled apparatus as shown in Fig. 1. The two housing sections 20 and 24 are in the open position in Fig. 19, in which position a fruit half is inserted in the fruit cup enclosed in the housing 20. The fruit half is held therein by suction applied to the fruit cup through the vacuum line 80. After insertion of the fruit half, air maintained in the compressed air tank 250 by the compressor 252, is fed through the line 62 into the control valve 60 passing therefrom through the lines 248 and 249 to the cylinders 32 and 42 respectively causing the piston 30 to move toward the right and the piston 38 to move toward the left. As the piston 30 moves toward the right the housing 20 engages the housing 24 as above described forming a sealed chamber in which are disposed the fruit holding cup and the reamer. After the chamber is sealed the movement of the piston 38 brings the dog 184 into engagement with the pin 186 of the rotor valve 172 which connects the chamber formed by the housings 20 and 24 with the vacuum bell 254, thereby evacuating the juicing chamber. Air is exhausted from the vacuum bell 254 by the vacuum pump 255. When the juicing chamber is evacuated the continued thrust of the piston 38 operates the piston valve 36 to supply air through line 83 to the lower portion of the cylinder 50 thereby raising the piston 49 and opening the valve 48 in the line 46 connecting the juicing chamber with the evacuated juice reservoir 256. The continued thrust of the piston 30 forces the fruit in the cup 140 (Fig. 4) against the reamer 162 (Fig. 6) disposed within the housing 24 causing the juice to be extracted from the fruit in the evacuated chamber. The juice flows through the line 46 into the reservoir 256.

At this stage in the operation the control valve 60 is rotated by engagement of one of the splines on the motor driven spline wheel 66 with one of the pins projecting from the rotor of the valve 60 channeling the compressed air from line 62 through lines 245 and 246 to reverse the strokes of the pistons 30 and 38 within the cylinders 32 and 42. At the same time as the piston 30 begins to withdraw the fruit holding cup from the reamer the piston 38 begins its return stroke and the spring loaded piston valve 36 reverses its position causing air to flow through line 85 into the upper end of the cylinder 50 thereby closing the valve 48. The reversal of the valve 36 also permits exhaustion of the air from the lower portion of cylinder 50 through line 83 into the piston valve 36 and out the exhaust port 260. Thereafter during the continued movement of the piston 38 its dog 185 strikes the pin 189, thereby actuating the rotor valve 34 which opens the juicing chamber to atmosphere through line 54 and the port 52. At this stage the fruit holding cup has been retracted within the housing 20 and the continued movement of the piston 30 towards the left withdraws the housing 20 from the housing 24 permitting the removal of the juiced fruit section and insertion of a second section. The operation of this cycle is then complete.

As shown in Fig. 1 the operation of the apparatus may be controlled automatically by means of a motor driven spline wheel adapted intermittently to change the position of the control valve 60 so as to cycle the equipment in the above described sequence. However, the control valve 60 may be equally as well operated by hand which permits the insertion and withdrawal of fruit sections at any desired speed.

By our invention we have provided a mechanism wherein fruit and particularly citrus fruit may be juiced under vacuum and the juice may be similarly stored under vacuum without intermediate exposure to the atmosphere thereby preventing the deleterious oxidation reactions which are normally initiated by atmospheric exposure. The mechanism of the invention is operable either by itself as a manually fed juicing unit or in combination with some existing machines for automatically washing, cutting and feeding fruit sections to the fruit holding cup. For example, the present vacuum apparatus may be combined with the fruit juicing machine described in copending application Serial No. 683,869, filed July 16, 1946. Such a combination would result in apparatus adapted automatically to cut the fruit, deposit the fruit sections in fruit holding cups such as the one herein described, juice the sections under vacuum and remove the peels from the fruit holding cup. Other operations such as ragging the juiced fruit may be included as for example, in the manner described in said copending application.

The invention has been described with relation to one embodiment of the apparatus but it is to be understood that the many detailed features thereof are not intended to limit the scope of the invention. Many modifications may occur to those skilled in the art with regard to mechanical features without departing from the scope of the invention as set forth in the foregoing description and in the following claims.

We claim:

1. Fruit juicing apparatus comprising in combination fruit holding means, a juicer, complementary members incorporating said fruit holding means and juicer and adapted to define a sealable chamber, means for causing the fruit holding means and juicer to approach each other in rotatable relationship within said sealable chamber, means for evacuating the chamber prior to contact of the juicer with fruit supported in the fruit holding means, a juice reservoir, means for maintaining the juice reservoir under vacuum, means communicating between the chamber and the reservoir and means in association with said last named means for isolating the reservoir from the chamber when the latter is not under vacuum, said chamber evacuating means being independent of said reservoir and being effective to evacuate said chamber without passing the evacuated air through said reservoir.

2. Fruit juicing apparatus comprising in combination fruit holding means disposed within a first housing, a juicer disposed within a second housing, means for engaging the first and second housing to form a closed chamber, means for evacuating said chamber, means for contacting the fruit supported in the fruit holding means with the juicer after evacuation of the chamber, a juice reservoir, means for maintaining the juice reservoir under vacuum, means communicating between the chamber and the reservoir and means in association with said last named means for isolating the reservoir from the chamber when the latter is not under vacuum, said chamber evacuating means being independent of said reservoir and being effective to evacuate said chamber without passing the evacuated air through said reservoir.

3. Fruit juicing apparatus comprising in combination fruit holding means, a juicer, means defining a sealable chamber embracing said fruit holding means and juicer, means for causing the fruit holding means and juicer to approach each other in rotatable relationship within said sealable chamber, means for evacuating said chamber prior to contact of the juicer with fruit supported in the fruit holding means, a juice reservoir, means for maintaining the juice reservoir under vacuum, means communicating between the chamber and the reservoir, means for destroying the vacuum in the chamber after the fruit has been juiced, and means for isolating the reservoir from the chamber when the latter is not under vacuum, said chamber evacuating means being independent of said reservoir and being effective to evacuate said chamber without passing the evacuated air through said reservoir.

4. Fruit juicing apparatus comprising in combination fruit holding means, a juicer, means defining a sealable chamber embracing said fruit holding means and juicer, means for causing the fruit holding means and juicer to approach each other in rotatable relationship within said sealable chamber, means for evacuating said chamber prior to contact of the juicer with fruit supported in the fruit holding means, a juice reservoir, means for maintaining the juice reservoir under vacuum, means communicating between the chamber and the reservoir, means for destroying the vacuum in the chamber after the fruit has been juiced, and means in association with said last named means for isolating the reservoir from the chamber when the latter is not under vacuum, said chamber evacuating means being independent of said reservoir and being effective to evacuate said chamber without passing the evacuated air through said reservoir.

5. Fruit juicing apparatus comprising in combination fruit holding means disposed within a first housing, a juicer disposed within a second housing, means for engaging the first and second housing to form a closed chamber, means for evacuating the chamber thus formed, means for contacting fruit supported in the fruit holding means with the juicer after evacuation of the chamber, a juice reservoir communicating with the chamber, means for maintaining the juice reservoir under vacuum, means for destroying the vacuum in the chamber after the fruit has been juiced, and means in association with said last named means for isolating the reservoir from the chamber when the latter is not under vacuum, said chamber evacuating means being independent of said reservoir and being effective to evacuate said chamber without passing the evacuated air through said reservoir.

6. Fruit juicing apparatus comprising in combination fruit holding means, a juicer, means defining a sealable chamber embracing said fruit holding means and juicer, means for causing the fruit holding means and juicer to approach each other in rotatable relationship within said sealable chamber, a juice reservoir, means for maintaining the juice reservoir under vacuum, means communicating between the chamber and the reservoir, a vacuum pump, means communicating between the vacuum pump and the chamber, a first valve disposed in said last named means, a second valve disposed in the means communicating between the chamber and the reservoir and means operable to actuate said first and second valves so as to evacuate said chamber prior to opening said second valve and to close said second valve prior to destroying the vacuum in the chamber, said communicating means between said vacuum pump and said chamber being independent of said reservoir and being effective to evacuate said chamber without passing the evacuated air from said chamber through said reservoir.

7. Fruit juicing apparatus comprising in combination fruit holding means disposed within a first housing, a juicer rotatably disposed within a first housing, a juicer rotatably disposed within a second housing, means for rotating the juicer, said fruit holding means being mounted on a piston adapted to engage said first and second housings to form a sealed chamber and to cause said fruit holding means to approach said juicer, a vacuum pump communicating with said second housing, a first valve means disposed between the vacuum pump and the second housing, means communicating between the second housing and the atmosphere, a second valve means disposed in said last named means, a juice reservoir, in communication with the vacuum pump, means communicating between the juice reservoir and the chamber, a third valve disposed in said last named means, and means for actuating said valves in fixed relationship to evacuate the chamber, to withdraw juice from the evacuated chamber into the reservoir, to isolate the reservoir from the chamber after removal of juice from the chamber and to destroy the vacuum in the chamber after isolation of the reservoir therefrom.

8. Apparatus according to claim 7 wherein said fruit holding means comprises a spherically recessed body member mounted on said piston and provided with a plurality of ports communicating through said piston with a vacuum pump.

9. Fruit juice extracting apparatus, comprising: relatively reciprocable complementary members defining, when closed, a sealable chamber; a juice reservoir; means for maintaining said juice reservoir under continuous vacuum; means for evacuating said sealable chamber when said chamber is closed; means including valves for effecting communication between said reservoir and chamber when said chamber is under vacuum, and isolating said reservoir from said chamber when said chamber is not under vacuum to prevent loss of vacuum in said reservoir; and juice extracting means including fruit engaging elements mounted in said complementary members, and means for effecting relative reciprocation and rotation of said elements when said chamber is sealed and under vacuum.

EARL R. ODOM.
HAROLD T. LANNEN.

REFERENCES CITED

The following references are of record in the file of this patent:

UNITED STATES PATENTS

| Number | Name | Date |
|---|---|---|
| 2,181,442 | Watkins | Nov. 28, 1939 |
| 2,346,561 | Delay | Apr. 11, 1944 |
| 2,353,841 | McKinnis | July 18, 1944 |